United States Patent
Fujita

(10) Patent No.: US 12,541,174 B2
(45) Date of Patent: Feb. 3, 2026

(54) DUCT UNIT HAVING AN ELASTIC SEAL BETWEEN JOINED DUCT SECTIONS

(71) Applicant: CANON KABUSHIKI KAISHA, Tokyo (JP)

(72) Inventor: Keiko Fujita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 18/464,171

(22) Filed: Sep. 8, 2023

(65) Prior Publication Data
US 2024/0094674 A1    Mar. 21, 2024

(30) Foreign Application Priority Data
Sep. 15, 2022   (JP) .................. 2022-146661

(51) Int. Cl.
G03G 21/00   (2006.01)
B41J 29/377  (2006.01)
F24F 7/06    (2006.01)
F24F 13/00   (2006.01)
F24F 13/02   (2006.01)
(Continued)

(52) U.S. Cl.
CPC .......... G03G 21/206 (2013.01); B41J 29/377 (2013.01); F24F 7/06 (2013.01); F24F 13/0209 (2013.01); H05K 7/20145 (2013.01); G03G 2221/1645 (2013.01)

(58) Field of Classification Search
CPC ........... G03G 21/206; G03G 2221/1645; B41J 29/377; H02B 1/56; H02B 1/565; H05K 7/20145; F24F 7/04; F24F 7/06; F24F 7/065; F24F 7/08; F24F 13/02; F24F 13/0209; F24F 13/0245

USPC ...... 399/92; 312/236; 361/678, 679.49, 690; 165/59, 100, 144, 145, 177, 178, 165/DIG. 538; 454/231, 232, 234, 241, 454/251, 252, 253
See application file for complete search history.

(56) References Cited

U.S. PATENT DOCUMENTS 5,653,482 A * 8/1997 Ficchi, Jr. ............... F16L 23/14
                                                     285/915
8,985,637 B1 * 3/2015 Little ...................... F16L 23/14
                                                     285/298
(Continued)

FOREIGN PATENT DOCUMENTS

DE    202020106632 U1 *  2/2022  ............ F16L 23/036
GB         2553119 A  *  2/2018  ............ F24F 13/0209
(Continued)

*Primary Examiner* — Robert B Beatty
(74) *Attorney, Agent, or Firm* — Venable LLP

(57) ABSTRACT

A duct unit that is coupled to a fan, the duct unit includes a first duct portion including a first joint portion, a second duct portion including a second joint portion that faces the first joint portion, and a seal member having elasticity. the first duct portion and the second duct portion are configured to form an airflow path by being joined to each other. The first joint portion includes a first surface and a projection portion projecting from the first surface. The projection portion includes a second surface in contact with the second joint portion of the second duct portion. The seal member is arranged between the first surface of the first joint portion and the second joint portion so as to come into contact with the first surface of the first joint portion and the second joint portion.

23 Claims, 6 Drawing Sheets

(51) Int. Cl.
*G03G 21/20* (2006.01)
*H05K 7/20* (2006.01)

(56) References Cited

U.S. PATENT DOCUMENTS

| | | | |
|---|---|---|---|
| 2002/0140231 A1* | 10/2002 | Poole | F24F 13/0209 |
| | | | 285/368 |
| 2003/0053908 A1 | 3/2003 | Takashima et al. | 415/200 |
| 2022/0268480 A1* | 8/2022 | Duffy | F24F 13/0281 |

FOREIGN PATENT DOCUMENTS

| | | | | |
|---|---|---|---|---|
| JP | 08-023398 B2 * | 3/1996 | | |
| JP | 2003-166497 | 6/2003 | | |
| KR | 101791943 B1 * | 11/2017 | | F16L 23/16 |
| KR | 102088933 B1 * | 3/2020 | | B65G 49/061 |

* cited by examiner

FIG.5A
FIG.5B
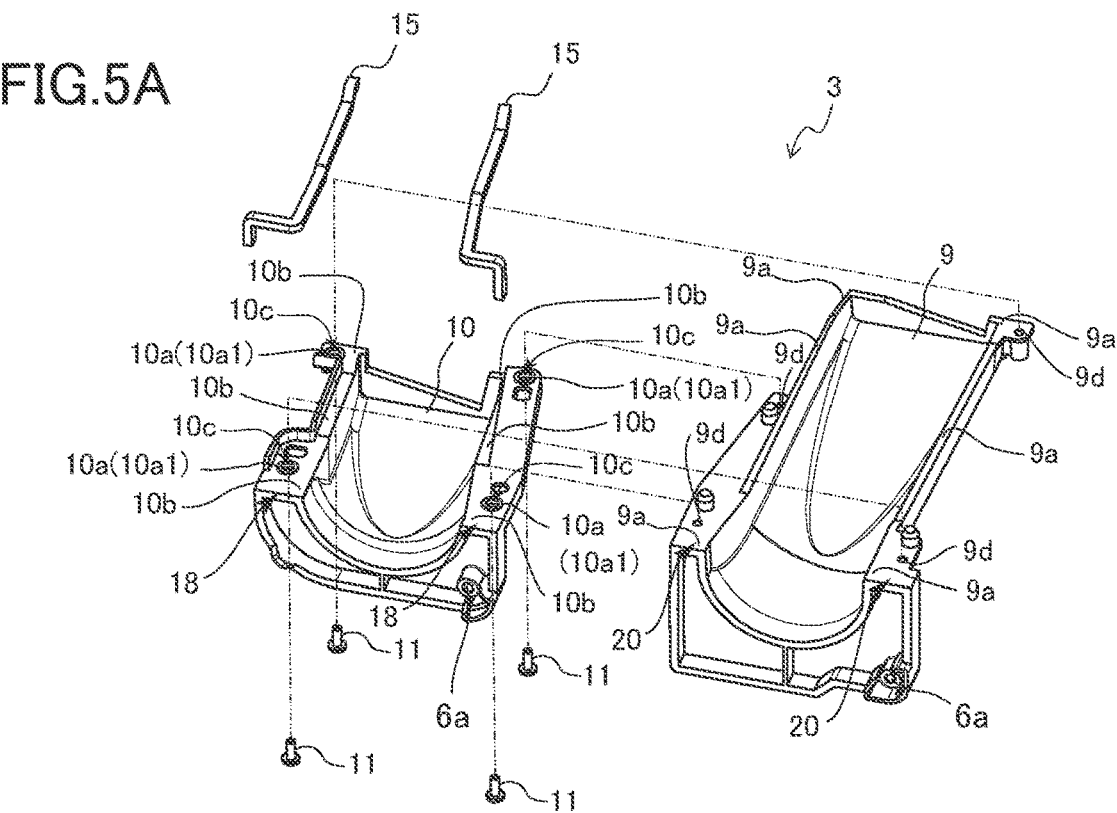
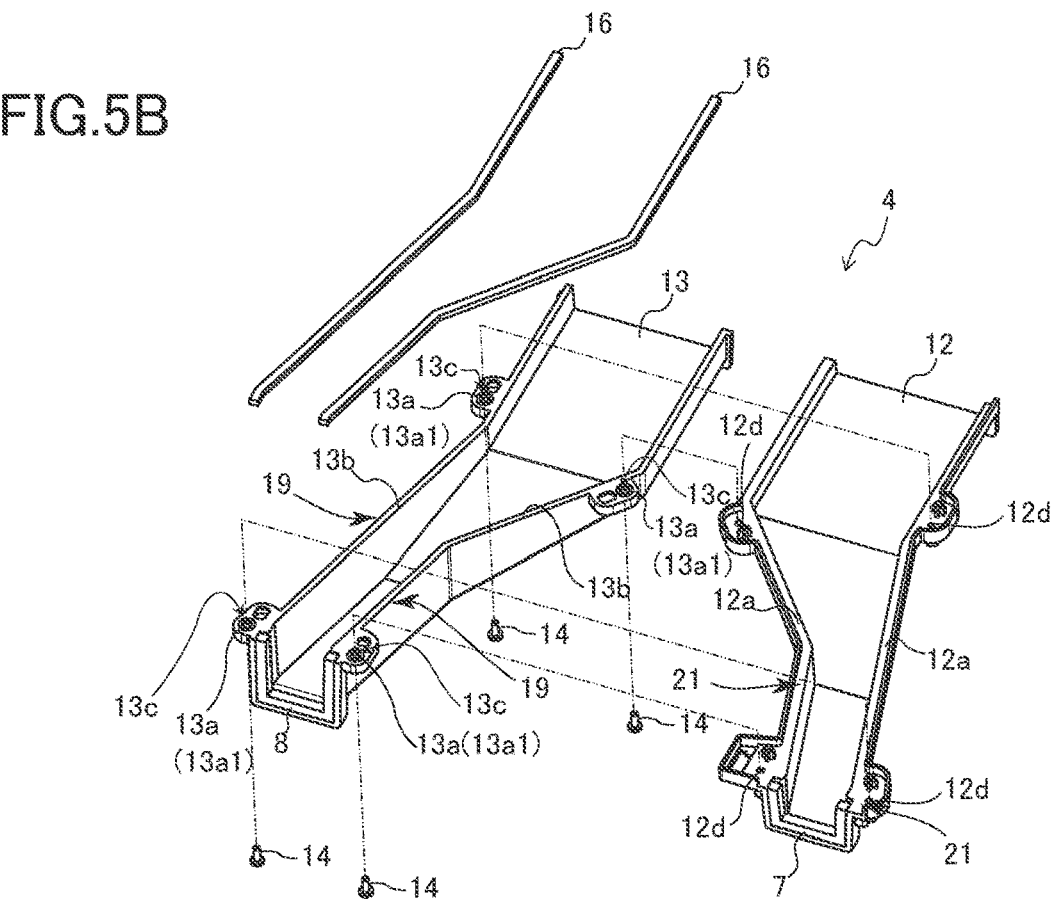

DUCT UNIT HAVING AN ELASTIC SEAL BETWEEN JOINED DUCT SECTIONS

BACKGROUND OF THE INVENTION

Field of the Invention

This disclosure relates to a duct unit that is arranged in an image forming apparatus such as a printer, a copier, a facsimile, or a multifunction machine, and forms a suitable airflow path for the passage of airflow generated by a fan.

Description of the Related Art

Image forming apparatuses use air blown into an interior of a casing for purposes such as heat dissipation, cooling, ventilation, dust collection, and the suction conveyance of a recording material. To introduce air into the casings, image forming apparatuses include fans for generating airflow and duct units that guide the airflow generated by the fans. As described in Japanese Patent Laid-Open No. 2003-166497, by taking into consideration such as assemblability and costs, the duct units are formed such that a plurality of duct portions are joined to form airflow paths for passing the airflow.

Incidentally, the image forming apparatuses are enlarged for high productivity, high image quality, high stability, long life, and enhanced functionality, and, accordingly, the fans and the duct units described above are also used in large sizes. However, in a case where the large size duct units are used, due to variations in the accuracy of the duct portions and deformation during assembly, small gaps are likely to be created in joint portions between the duct portions. Therefore, there is a possibility of the occurrence of vibration sounds induced by collisions of the duct portions against each other within the gaps due to vibrations caused by the fans, or a wind noise due to the leakage of the air through the gaps.

SUMMARY OF THE INVENTION

According to one aspect of the present invention, a duct unit is coupled to a fan. The duct unit includes a first duct portion including a first joint portion, a second duct portion including a second joint portion that faces the first joint portion, and a seal member having elasticity. The first duct portion and the second duct portion are configured to form an airflow path by being joined to each other. The first joint portion includes a first surface and a projection portion projecting from the first surface. The projection portion includes a second surface in contact with the second joint portion of the second duct portion. The seal member is arranged between the first surface of the first joint portion and the second joint portion so as to come into contact with the first surface of the first joint portion and the second joint portion.

Further features of the present invention will become apparent from the following description of exemplary embodiments with reference to the attached drawings.

BRIEF DESCRIPTION OF THE DRAWINGS

FIG. 5A is an exploded perspective view illustrating an intake duct unit of the present embodiment.

FIG. 5B is an exploded perspective view illustrating an exhaust duct unit of the present embodiment.

DESCRIPTION OF THE EMBODIMENTS

Image Forming System

Figure 1:
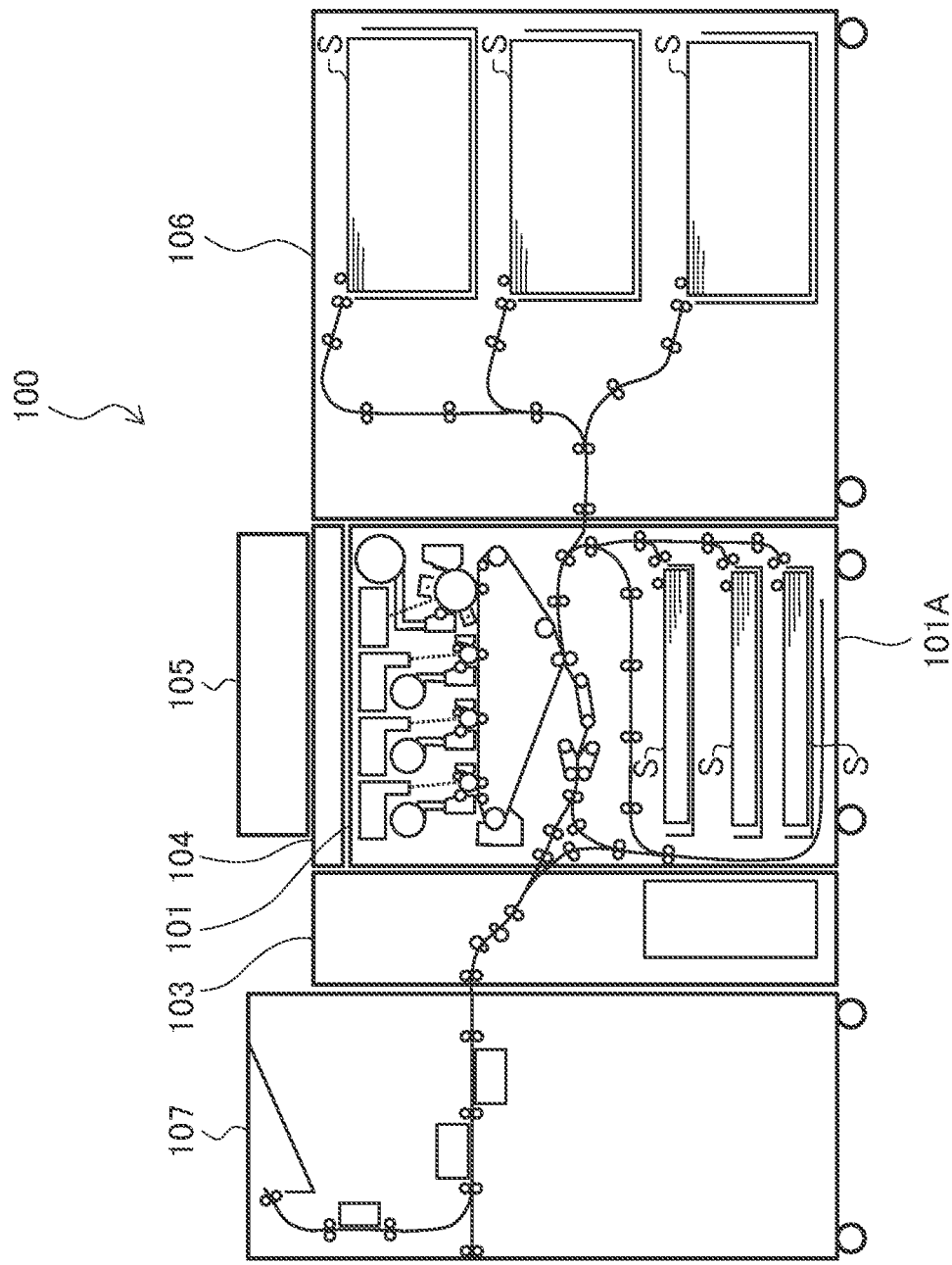
FIG. 1 is a schematic view illustrating an image forming system including an image forming apparatus.

Hereinafter, the present embodiment will be described. First, an image forming system will be described. As illustrated in FIG. 1, the image forming system 100 of the present embodiment is broadly divided into, and includes: a large capacity sheet feed apparatus 106, an image forming apparatus 101, a decurler 103, and a sensing apparatus 107. With respect to a conveyance direction of a recording material S (from right to left in FIG. 1) between each of these apparatuses, in reference to the image forming apparatus 101, the large capacity sheet feed unit 106 is arranged upstream, and the decurler 103 is arranged downstream. Then, the sensing apparatus 107 is arranged downstream of the decurler 103. These large capacity sheet feed apparatus 106, image forming apparatus 101, decurler 103, and sensing apparatus 107 are physically connected so as to be able to convey the recording material S, and are electrically connected so as to be able to transmit and receive an electrical signal.

The large capacity sheet feed apparatus 106 includes a plurality of recording material storage portions, and is an apparatus that supplies the recording material S stored in the recording material storage portions to the image forming apparatus 101 one sheet at a time. The decurler 103 is an apparatus that corrects a curl of the recording material S in a case where the recording material S has been curled by heat applied at fixing of a toner image in the image forming apparatus 101.

The sensing apparatus 107 is an apparatus that reads the toner image on one side or both sides of the recording material S discharged from the decurler 103. A signal of the toner image that has been read by the sensing apparatus 107 is transmitted to the image forming apparatus 101, and, in the image forming apparatus 101, deviations in image density and an image position are detected based on the signal transmitted from the sensing apparatus 107, so that, accordingly, an image signal with respect to the toner image that is formed on the recording material S is corrected. By controlling an image forming units 200Y to 200K, described below, based on the corrected image signal, the toner image whose deviations in the image density and the image position have been corrected is formed on the recording material S.

To be noted, in place of the large capacity sheet feed apparatus 106, it is acceptable to selectively connect such as a manual sheet feed apparatus and a long sheet feed apparatus capable of storing a long recording material, not shown, to an upstream side of the image forming apparatus 101 in the recording material conveyance direction. Alternatively, it is possible to selectively overlappingly connect such as the large capacity sheet feed apparatus, the manual sheet feed apparatus, and the long sheet feed apparatus, not shown, to farther upstream side than the large capacity sheet feed apparatus 106. Further, while it is not shown, to a farther downstream side than the decurler 103 or the sensing apparatus 107, it is possible to selectively connect one of or a combination of a plurality of various post-processing apparatuses such as an inserter, a puncher, a casing-in and bookbinding machine, a large capacity stacker, a folding machine, a finisher, and a trimmer. By selectively connecting various optional apparatuses to the image forming apparatus 101 as described above, it becomes possible to inline output deliverables that have been provided with diverse post-processing with respect to a wide range of the recording material S, and it is possible to provide the image forming system 100 that has high productivity, high image quality, high stability, and enhanced functionality.

Figure 2A:
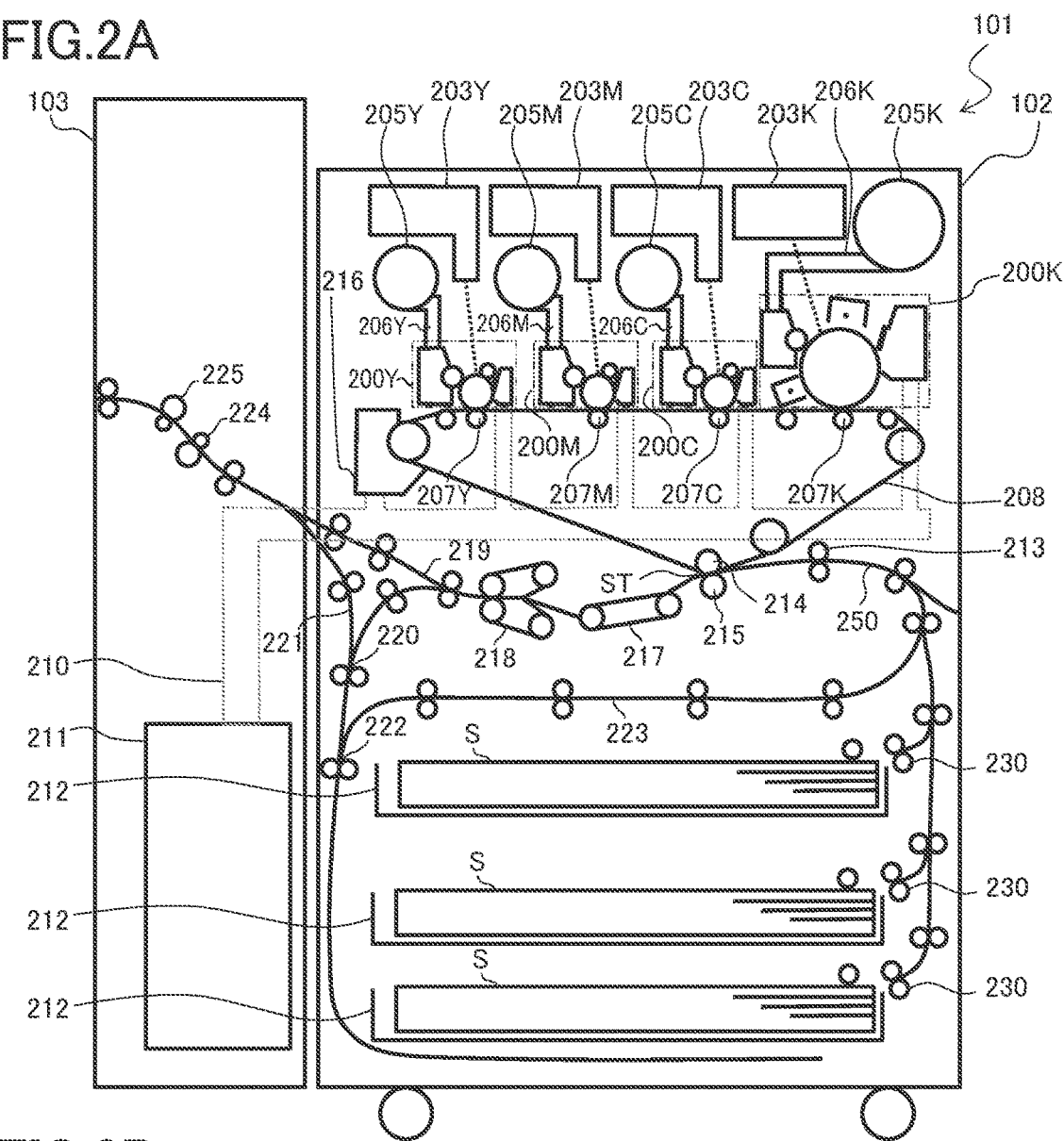
FIG. 2A is a cross-sectional view illustrating the image forming apparatus.

The image forming apparatus 101 includes a casing 101A, and a document reading apparatus 104 that reads image information of a document, and a document feeding apparatus 105 that feeds the document to the document reading apparatus 104 one sheet at a time are selectively connected to the casing 101A. The casing 101A is, for example, constituted from a plurality of frames such as a front side plate arranged on the front side, a back side plate arranged on the back side, and columns connecting and supporting the front and back side plates. The image forming units 200Y to 200K, exposing apparatuses 203Y to 203K, a pre-fixing conveyance belt 217, and a fixing unit 218 that are illustrated in FIG. 2A, described below, are secured to the frames such as the front and back side plates.

Image Forming Apparatus

Figure 2B:
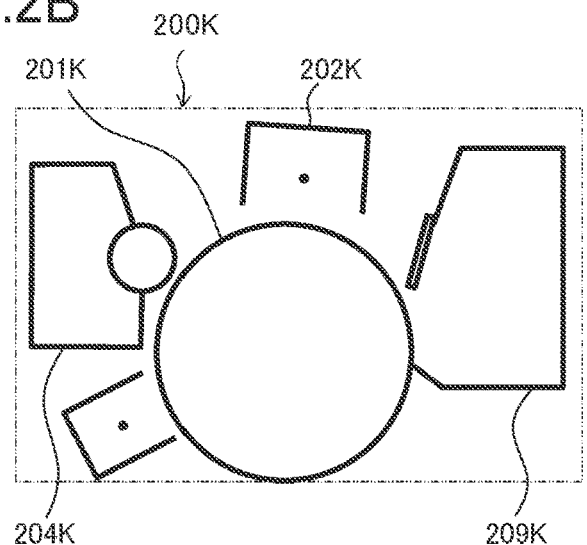
FIG. 2B is an enlarged view illustrating an image forming unit.

Next, with reference to FIG. 1, a configuration of the image forming apparatus 101 will be described using FIGS. 2A and 2B. The image forming apparatus 101 illustrated in FIG. 2A is an apparatus of an intermediate transfer system in which the image forming units 200Y, 200M, 200C, and 200K respectively forming the toner images of yellow, magenta, cyan, and black, contained in an interior of the casing 101A (within the casing 101A) are arranged so as to face an intermediate transfer belt 208. The image forming apparatus 101 forms the toner image on the recording material S based on the image signal received from the document reading apparatus 104 (refer to FIG. 1) disposed on the casing 101A or an external apparatus, not shown, such as a personal computer.

A conveyance process of the recording material S in the image forming apparatus 101 will be described. The recording material S is stored in a manner of being stacked inside of one or a plurality of cassettes 212, and supplied by sheet supply rollers 230 one sheet at a time in synchronization with a timing of image formation. The recording material S that has been supplied by the sheet supply rollers 230 is conveyed to a registration roller 213 arranged midway in a conveyance path 250. Then, the skew and timing correction of the recording material S are performed at the registration roller 213, and the recording material S is sent to a secondary transfer portion ST. The secondary transfer portion ST is formed by a secondary transfer inner roller 214 and a secondary transfer outer roller 215 that face each other across the intermediate transfer belt 208, and is a nip portion that transfers the toner image from the intermediate transfer belt 208 onto the recording material S by applying a predetermined pressure and a secondary transfer voltage.

An image forming process which conveys the image to the secondary transfer portion ST described above performed in a similar timing with respect to the conveyance process of the recording material S will be described. First, the image forming units 200Y to 200K will be described. However, since the image forming units 200Y to 200K of respective colors are basically the same except for a color of toner, the image forming unit 200K of black will be described as a representative example.

The image forming unit 200K includes such as a photosensitive drum 201K, a charge unit 202K, a developing unit 204K, and a drum cleaner 209k. After a surface of the photosensitive drum 201K that rotates has been uniformly charged by the charge unit 202K, an electrostatic latent image is formed by the exposing unit 203K driven based on the image signal. Next, the developing unit 204K develops the electrostatic latent image formed on the photosensitive drum 201K using the toner contained in developer, and the toner image is formed on the photosensitive drum 201K. The toner consumed by the development is appropriately replenished from a toner bottle 205K to the developing unit 204K via a toner replenishment path 206K.

Thereafter, a predetermined pressure and a primary transfer voltage are applied by a primary transfer roller 207K arranged in a manner facing the image forming unit 201k across the intermediate transfer belt 208, the toner image formed on the photosensitive drum 201K is primarily transferred onto the intermediate transfer belt 208. Primary transfer residual toner remained on the photosensitive drum 201K after the primary transfer is collected by the drum cleaner 209K. The primary transfer residual toner that has been collected is stored in a recovery toner container 211 disposed in the decurler 103 via a toner collection path 210.

The intermediate transfer belt 208 is an endless belt that is stretched by a plurality of stretching rollers and the secondary transfer inner roller 214, and is moved by, for example, a motor (not shown) at a speed corresponding to rotational speeds of the photosensitive drums 201Y to 201K. Image forming processes for the respective colors, which are performed in parallel by the image forming units 200Y to 200K described above, are carried out with timing that sequentially superimposes toner images of the respective colors onto toner images that have been primarily transferred onto the intermediate transfer belt 208 at an upstream position in the moving direction. As a result, eventually, a full color toner image is formed on the intermediate transfer belt 208, and conveyed to the secondary transfer portion ST. Secondary transfer residual toner remaining on the intermediate transfer belt 208 after having passed through the secondary transfer portion ST is collected from the intermediate transfer belt 208 by a belt cleaning apparatus 216. The secondary transfer residual toner that has been collected is stored in the recovery toner container 211 via the toner collection path 210.

By the sheet conveyance process and the image forming process described above, the timing of the recording material S and the toner image is synchronized at the secondary transfer portion ST, where a secondary transfer is performed to transfer the toner image from the intermediate transfer belt 208 onto the recording material S. The recording material S, onto which the toner image has been transferred, is conveyed to the fixing unit 218 in synchronization with the rotation of the pre-fixing belt 217. The recording material S is carried on a surface of the belt while being held by the pre-fixing belt 217, which is formed in an endless loop. The fixing unit 218 includes a fixing belt that is heated by a heater (not shown) and a pressing belt that presses the recording material S with respect to the fixing belt. The recording material S on which the toner image has been formed is heated and pressed, while being nipped and conveyed by a fixing nip portion formed by the fixing and pressing belts. Thereby, the toner image is fixed on the recording material S.

In a case of a one side mode in which the toner image is formed only on one side of the recording material S, the recording material S with the toner image formed on one side is conveyed to the decurler 103. At this time, in a case of conveying to the decurler 103 by reversing the front and back sides of the recording material S, the recording material S on which the toner image has been formed is guided to a sheet discharge reverse portion 220, and switchback conveyance is performed. Thereby, simultaneously with the alternation of a leading edge and trailing edge of the recording material S, the front and back sides are reversed, and the recording material S with the front and back sides reversed is conveyed to the decurler 103 via a sheet reverse discharge path 221.

On the other hand, in a case of a duplex mode in which the toner image is formed on both surfaces of the recording material S, the recording material S with the toner image formed on the first surface is guided to a duplex reverse portion 222, and the switchback conveyance is performed. Thereby, simultaneously with the alternation of the leading edge and trailing edge of the recording material S, the front and back sides are reversed. The recording material S with the front and back sides reversed is conveyed to the registration roller 213 arranged midway in the conveyance path 250 via a duplex conveyance path 223. Thereafter, the toner image is formed on a second surface of the recording material S by a similar process that has been performed on the first surface, and, after the toner image has been fixed on the second surface, the recording material S is conveyed to the decurler 103 via a sheet discharge conveyance path 219.

Blowing Apparatus

Figure 3:
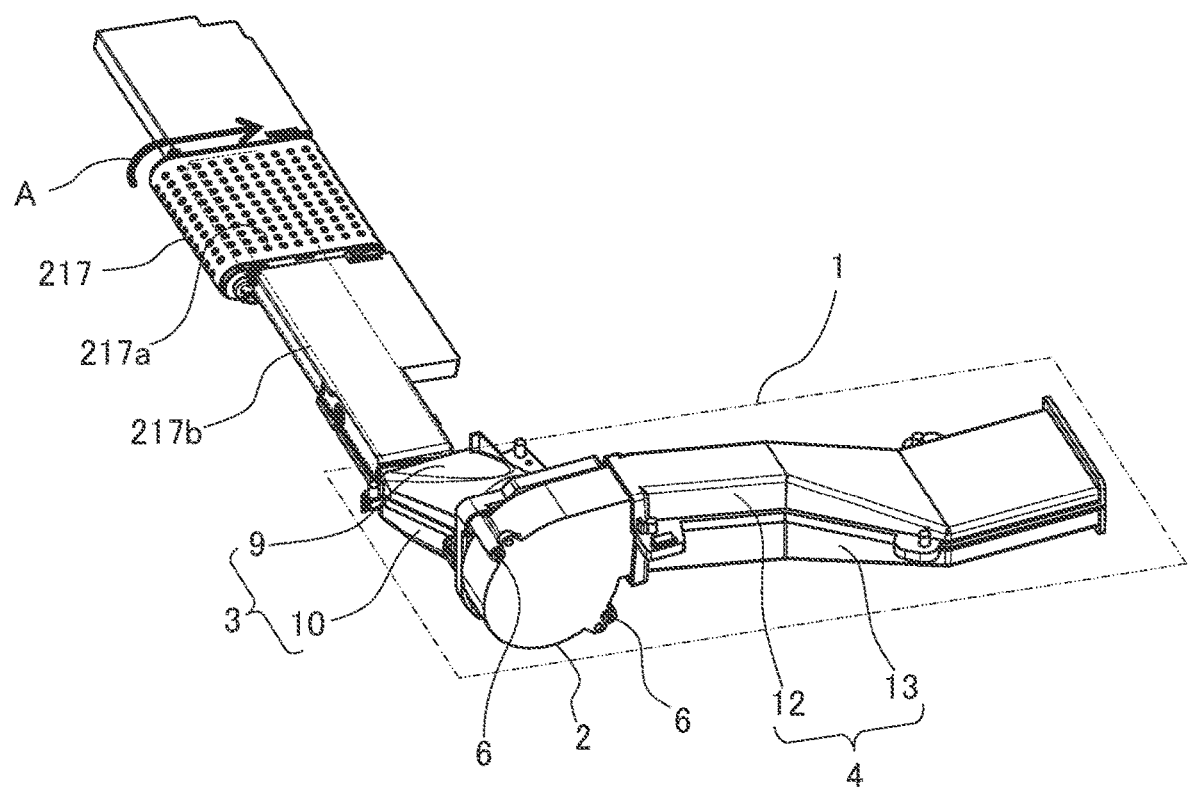
FIG. 3 is a perspective view illustrating a blowing apparatus.
Figure 4:
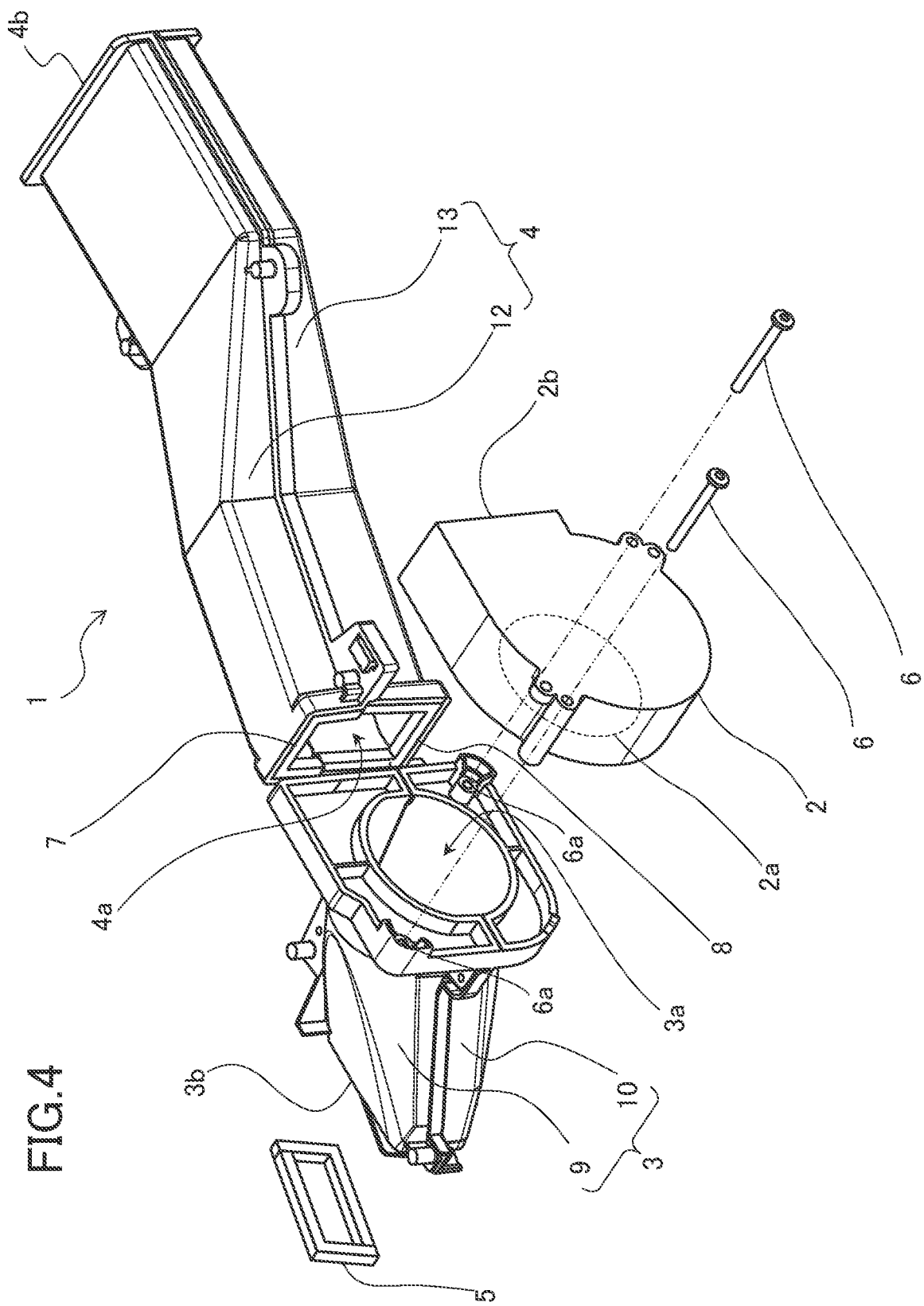
FIG. 4 is a perspective view illustrating the blowing apparatus before the installation of a blower fan.

Next, in the image forming apparatus 101, a blowing apparatus that functions as a blowing unit and is disposed within the casing 101A to perform air blowing will be described with reference to FIGS. 3 to 6. FIG. 3 is a perspective view illustrating the blowing apparatus 1 connected to the pre-fixing conveyance belt 217. FIG. 4 is a perspective view illustrating the blowing apparatus 1 before installation of a blower fan 2. To. It should be noted that, in the following description, for ease of understanding, the blowing apparatus 1 connected to the pre-fixing conveyance belt 217 and generating suction force to convey the recording material S by suction will be described as an example.

As illustrated in FIG. 3, a plurality of suction holes 217a, serving as an opening, so as to draw air from the outside to the inside of the belt are formed in the pre-fixing conveyance belt 217. An inner duct 217b is arranged inside of this pre-fixing conveyance belt 217, and the blowing apparatus 1 is connected to the inner duct 217b so as to be able to draw outside air via the suction holes 217a of the pre-fixing conveyance belt 217. The blowing apparatus 1 is broadly divided into and constituted from: the blower fan 2, an intake duct unit 3, and an exhaust duct unit 4.

The blower fan 2 generates airflow by blowing the air. When the blower fan 2 is operated, in the pre-fixing conveyance belt 217, it is possible to generate suction force for drawing the recording material S via the suction holes 217a. The pre-fixing conveyance belt 217 is disposed in a manner rotatable by a drive source, not shown, in an arrow A direction in FIG. 3, and rotates while drawing a surface opposite to an image formation surface of the recording material S on which the toner image has been formed immediately before. Thereby, while aligning with a surface of the pre-fixing conveyance belt 217, the recording material S is conveyed to the fixing unit 218 in a steady state in which unfixed toner image remains undisturbed.

Recently, in the image forming apparatus 101, there is an increasing demand for printing on a higher stiffness recording material S such as cardboard and an envelope, and on a smaller size recording material S such as a postcard and a single card. So as to stably convey a large variety of the recording material S as described above, a large size blower fan 2 having a larger suction force is used for the blowing apparatus 1. In such a case, so as to generate an optimum suction force depending on a material and a shape of the recording material S that is conveyed, a rotation speed of the blower fan 2 is adjusted by a control circuit, not shown.

Overview of Intake Duct Unit

The intake duct unit 3 is arranged between the inner duct 217b and the blower fan 2, and, as illustrated in FIG. 4, a first end portion 3a of the intake duct unit 3 is joined to an air inlet 2a of the blower fan 2. The blower fan 2 is secured to the first end portion 3a of the intake duct unit 3 with fastening screws 6. For that purpose, fastening holes 6a for securing the blower fan 2 using the fastening screws 6 are formed in the first end portion 3a of the intake duct unit 3.

When fastening the blower fan 2 to the intake duct unit 3, may be considered to interpose an anti-vibration material, such as an elastic member, between the blower fan 2 and the intake duct unit 3 in order to suppress transmission of vibration from the blower fan 2 to the intake duct unit 3. However, when a large blower fan 2 is used, the anti-vibration material may elastically deform due to vibration of the blower fan 2 during rotational drive which can result in an unstable posture of the blower fan 2 and lead to eccentric rotation. In such a case, the vibration of the blower fan 2 increases further, and the intake duct unit 3 may also vibrate significantly. Accordingly, in the present embodiment, so as to stabilize the posture of the blower fan 2 during rotational drive without interposing any anti-vibration material, the blower fan 2 is directly secured to the intake duct unit 3, which has high stiffness.

A second end portion 3b of the intake duct unit 3 is joined to an inner duct 217b (see FIG. 3) of the pre-fixing conveyance belt 217 described above. An annular seal member 5 is seamlessly adhered to an inner surface of the intake duct unit 3 at the second end portion 3b using, for example, double-sided tape. The inner duct 217b is fitted inside the second end portion 3b of the intake duct unit 3, so that the intake duct unit 3 and the inner duct 217b are joined to each other via the seal member 5. By compressing and seamlessly adhering the seal member 5 to the inner duct 217b, airtightness at the joint portion between the intake duct unit 3 and the inner duct 217b is maintained, preventing air leakage from the joint. Furthermore, because the seal member 5 is an elastic body, even if dynamic displacement occurs between the intake duct unit 3 and the inner duct 217b due to vibration, collision between these high stiffness members is suppressed. As a result, occurrence of vibration noise caused by contact between the intake duct unit 3 and the inner duct 217b can be suppressed.

Overview of Exhaust Duct Unit

On the other hand, a first end portion 4a of the exhaust duct unit 4 is joined to an exhaust port 2b of the blower fan 2. A pair of seal members 7 and 8, which form an annular shape when combined, are seamlessly adhered to an inner surface of the exhaust duct unit 4 at the first end portion 4a using, for example, double-sided tape. The blower fan 2 is secured such that a portion of the blower fan 2 on the side of the exhaust port 2b is fitted inside the first end portion 4a of the exhaust duct unit 4, so that the exhaust duct unit 4 and the blower fan 2 are joined to each other via the seal members 7 and 8. By compressing and seamlessly adhering the seal members 7 and 8 to the exhaust port 2b of the blower fan 2, airtightness at the joint portion between the exhaust duct unit 4 and the blower fan 2 is maintained, thereby preventing air leakage from the joint. Furthermore, because the seal members 7 and 8 are elastic bodies, even if dynamic displacement occurs between the exhaust duct unit 4 and the blower fan 2 due to vibration, collision between these high stiffness members is suppressed. As a result, occurrence of vibration noise caused by contact between the exhaust duct unit 4 and the blower fan 2 can be suppressed. It should be noted that a second end portion 4b of the exhaust duct unit 4 is joined to an exhaust port (not shown) of the image forming apparatus 101.

Seal Member

The seal members 5, 7, and 8, as well as seal members 15 and 16 (see FIGS. 5A and 5B), are formed of an expanded foam material produced from synthetic rubber and expanded into a semi-independent and semi-continuous cellular structure. The expanded foam material of this semi-independent and semi-continuous type exhibits a softer characteristic and lower repulsive force compared to an independent cell expanded foam material or a non-foamed synthetic rubber material. Accordingly, with respect to surfaces that are displaced due to variations in part accuracy or deformation during assembly, and that are dynamically displaced by vibration, the material readily conforms to the surfaces, thereby maintaining adhesiveness. On the other hand, the expanded foam material of the semi-independent and semi-continuous type, in its uncompressed state, provides lower airtightness compared to the independent cell expanded foam material and the non-foamed synthetic rubber material. However, when compressed, the semi-independent and semi-continuous foam transitions into a more independent cell state, thereby achieving a high level of airtightness equivalent to that of the independent cell expanded foam material and the non-foamed synthetic rubber material. Therefore, in the present embodiment, the seal members 5, 7, 8, 15, and 16 are formed of the expanded foam material of the semi-independent and semi-continuous type.

Configuration of Duct Unit

Figure 6:
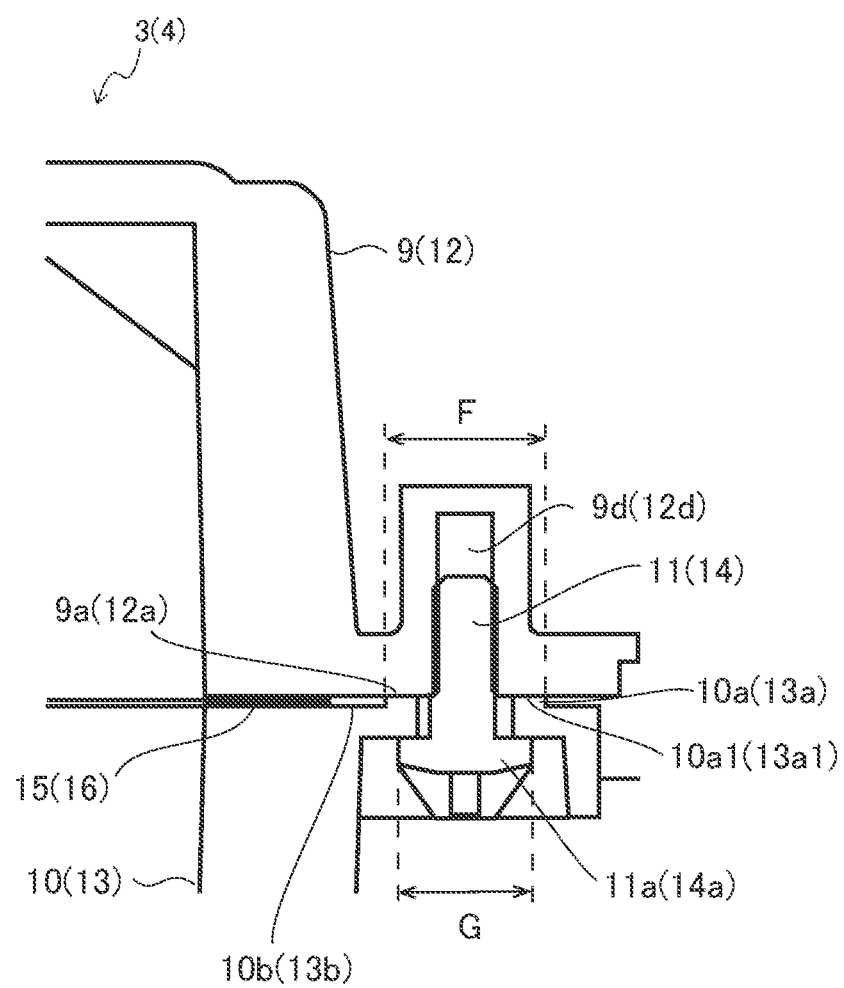
FIG. 6 is a cross-sectional view illustrating in a magnified manner a fastening portion of an intake upper duct portion and an intake lower duct portion.

Next, configurations of the intake and exhaust duct units 3 and 4 described above will be described. In the present embodiment, although shapes are not the same, the intake and exhaust duct units 3 and 4 share a similar configuration in that they are formed by a pair of duct portions. FIG. 5A is an exploded perspective view illustrating the intake duct unit 3, and FIG. 5B is an exploded perspective view illustrating the exhaust duct unit 4. However, in FIG. 5A, an illustration of the annular seal member 5 adhered to the second end portion 3b of the intake duct unit 3 is omitted (refer to FIG. 4). FIG. 6 is an enlarged cross-sectional view illustrating a joint portion of an intake upper duct portion 9 and an intake lower duct portion 10.

As illustrated in FIG. 5A, the intake duct unit 3 includes the intake upper duct portion 9, serving as a second duct portion, and the intake lower duct portion 10, serving as a first duct portion, and the seal member 15. In the intake duct unit 3, the pair of the intake upper and lower duct portions 9 and 10 are joined by sandwiching the seal members 15 so as to form an airflow path to cause the airflow to pass through and by being fastened using screws 11 at four positions that form a substantially rectangular shape.

On the other hand, as illustrated in FIG. 5B, the exhaust duct unit 4 includes an exhaust upper duct portion 12, serving as the second duct portion, an exhaust lower duct portion 13, serving as the first duct portion, and a seal member 16. In the exhaust duct unit 4, the exhaust upper and lower duct portions 12 and 13 are combined in a manner sandwiching the seal member 16 so as to form an airflow path through which the airflow passes, and are assembled by being fastened using screws 14 at four predetermined positions. Further, to inner sides of first end portions of the exhaust upper and lower duct portions 12 and 13, concave shaped seal members 7 and 8, which form an annular shape by being combined, are adhered using, for example, double-sided tape.

As described above, in the present embodiment, the intake upper duct portion 9, the intake lower duct portion 10, the exhaust upper duct portion 12, and the exhaust lower duct portion 13 that are separately manufactured by taking into consideration such as assemblability and manufacturing costs are respectively combined so as to form the intake and exhaust duct units 3 and 4. Therefore, the intake upper and lower duct portions 9 and 10 respectively include second joint portions 20 and first joint portions 18 that form joints by facing each other when combined. Similarly, the exhaust upper and lower duct portions 12 and 13 respectively include second joint portions 21 and first joint portions 19 that form joints by facing each other when combined.

As illustrated in FIG. 5A, the first joint portions 18 of the intake lower duct portion 10 include non-contact surfaces 10b and contact portions 10a. The non-contact surface 10b leaves a gap of a predetermined gap amount from a contact surface 9a of the intake upper duct portion 9. The contact portion 10a projects from the non-contact surface 10b toward the contact surface 9a, and comes into contact with the contact surface 9a. Similarly, as illustrated in FIG. 5B, the first joint portions 19 of the exhaust lower duct portion 13 include non-contact surfaces 13b and contact portions 13a. The non-contact surface 13b leaves a gap of a predetermined gap amount from a contact surface 12a of the exhaust upper duct portion 12. The contact portion 13a projects from the non-contact surface 13b toward the contact surface 12a, and comes into contact with the contact surface 12a. In other words, when the non-contact surfaces 10b and 13b described above are referred to as first surfaces, the contact portions 10a and 13a can be referred to as projection portions that project from the first surfaces 10b and 13b, and include second surfaces 10a1 and 13a1, serving as contact surfaces coming into contact with the second joint portions 20 and 21 of the second duct portions 9 and 12.

In the present embodiment, by reducing areas of the contact surfaces 10a1 and 13a1 on which the contact portions 10a and 13a come into contact with the joint surfaces 9a and 12a, a variation in the flatness in the contact portions 10a and 13a due to manufacturing is decreased. The areas of the contact surfaces 10a1 and 13a1 (areas of portions that come into contact with the second joint portions 20 and 21) are smaller than areas in which the seal members 15 and 16 come into contact with the non-contact surfaces 10b and 13b, and are preferably equal to or more than 5% and equal to or less than 15% of the areas in which the seal members 15 and 16 come into contact with the non-contact surfaces 10b and 13b. In the present embodiment, the area of the contact surface 10a1 has been set to 10% of the area in which the seal member 15 comes into contact with the non-contact surface 10b, and the area of the contact surface 13a1 has been set to 5.5% of the area in which the seal member 16 comes into contact with the non-contact surface 13b. To be noted, it is acceptable to vary the areas of the contact surfaces 10a1 and 13a1 depending on the size of the first joint portions 18 of the intake lower duct portion 10 and 19 of the exhaust lower duct portion 13.

Further, the intake and exhaust upper duct portions 9 and 12 include screw holes 9d and 12d for fastening using screws 11 and 14, serving as fastening members. Through holes 10c and 13c are formed in the contact portions 10a and 13a so as to allow the screws 11 and 14 to pass through. The contact surfaces 10a1 and 13a1 are formed in a circular shape. In other words, the contact portions 10a and 13a are formed as cylindrical projection portions that project from the non-contact surfaces 10b and 13b so as to surround the through holes 10c and 13c through which the screws 11 and 14 respectively pass. Thereby, it is possible to make it unlikely for gaps to be generated in the contact surfaces 10a1 and 13a1 by the fastening forces of the screws 11 and 14. Further, it is possible to regulate displacement with respect to the joint surfaces 9a of the intake upper duct portion 9 and 12a of the exhaust upper duct portion 12, which respectively face the contact surfaces 10a1 and 13a1.

In the present embodiment, as illustrated in FIG. 6, a diameter F of the contact surface 10a1 (13a1) is preferably equal to or more than 100% and equal to or less than 120% of a diameter G of a head 11a (14a) of the screw 11 (14). This is because, if the diameter F of the contact surface 10a1 (13a1) is smaller than the diameter G of the head 11a (14a) of the screw 11 (14), there is a possibility that the contact portion 10a (13a) that is projecting is crushed by the fastening force of the screw 11 (14) so as to narrow the gap. On the other hand, if the diameter F of the contact surface 10a1 (13a1) is excessively larger than the diameter G of the head 11α (14a) of the screw 11 (14), there is a possibility that displacement, which cannot be regulated by the fastening force of the screw 11 (14), with respect to the joint surface 9a (12a) occurs so as to generate the vibration sound. In the present embodiment, with respect to a diameter of φ 6.3 millimeters (mm) of the head of the screw 11 (14), the diameter of the contact surface 10a1 (13a1) is set to φ 7.5 mm.

Then, as illustrated in FIG. 6, since each of the seal members 15 (16) is adhered to each of the non-contact surfaces 10b (13b) using such as the double-sided tape, the gaps between the non-contact surfaces 10b (13b) and the joint surfaces 9a (12a) are filled by the seal members 15 (16). By interposing the seal members 15 (16) in the gaps as described above, in the non-contact surfaces 10b (13b), the generation of a wind noise caused by the air that leaks from the gaps is suppressed.

As described above, the expanded foam material of the semi-independent and semi-continuous foam type is used for the seal members 15 (16), and, as illustrated in FIG. 6, the seal members 15 (16) are preferably arranged in a manner facing and exposed to the airflow path. This is because, for example, if the seal member 15 (16) does not face the airflow path, in the inside of the joint between the upper duct portion (9, 12) and the lower duct portion (10, 13), the gap becomes an unevenly formed groove, and part of the air passing through the airflow path becomes likely to enter. In a case of the unevenly formed airflow path described above, by generating a turbulent flow, it is likely to bring an increase in a pressure loss. So as to prevent this, it is preferred that the seal member 15 (16) is arranged in a manner facing the airflow path, and the airflow path is formed without any concave and convex portions.

In an uncompressed state, the seal member 15 (16) is thicker than a gap amount of the gap between the joint surface 9a (12a) and the non-contact surface 10b (13b), but is compressed to a thickness equal to the gap amount by the fastening force of the screw 11 (14), and, thus, seamlessly adhered to the joint surface 9a (12a) and the non-contact surface 10b (13b). Even if the gap amount is varied due to variations in the accuracy of the upper duct portions (9, 12) and the lower duct portions (10, 13), deformation during assembly, and the vibration of the blower fan 2, the seal member 15 (16) can sustain adhesiveness with respect to the joint surface 9a (12a) and the non-contact surface 10b (13b) by an elastic force possessed by the seal member 15 (16).

In the present embodiment, by taking into consideration surface deformation caused by part tolerances, the flatness, and the vibrations of the upper duct portions (9, 12) and the lower duct portions (10, 13), a projection amount of the contact portion 10a (13a) from the non-contact surface 10b (13b) is preferably set to equal to or more than 0.4 mm. Thereby, even in a case where displacement occurs in the non-contact surfaces 10b (13b) and the joint surfaces 9a (12a), it is possible to secure a sufficient gap amount which does not allow the non-contact surfaces 10b (13b) to come into contact with the contact surfaces 9a (12a) on which the seal members 15 (16) are not present. Therefore, even by receiving the vibration of the blower fan 2, collisions do not occur between the intake upper and lower duct portions 9 and 10 and between the exhaust upper and lower duct portions 12 and 13, so that it is possible to suppress the occurrence of the vibration sound in the contact portions 10a and 13a.

However, if the seal member 15 (16) is placed in a state of large compression amount, there is a possibility that its elasticity may decrease over time, causing the thickness to become thinner (so called creep deformation). As a result, gaps may be formed, leading to the generation of vibration noise and wind noise. Therefore, in the present embodiment, the height of the contact portion 10a (13a) is adjusted such that the seal member 15 (16) is compressed by an amount at which it can maintain resilience, thereby preventing the generation of vibration noise and wind noise caused by creep deformation. For example, in a case where the seal members 15 (16) have an initial, uncompressed thickness of 3 mm, the height of the contact portions 10a (13a) is set to 0.5 mm, and the seal members 15 (16) are compressed from 3 mm to 0.5 mm, which equates to a compression ratio of 83%. It should be noted that, while equal to or more than 50% is preferred as the compression ratio of the seal members 15 (16), if the compression ratio is equal to or more than 20% and equal to or less than 90%, it is possible to obtain the sufficient sealability of the air passing through the airflow path, while sustaining the resilience.

As described above, in the present embodiment, among the second joint potions (20, 21) of the upper duct portions (9, 12) and the first joint portions (18, 19) of the lower duct portions (10, 13), the contact portions (10a, 13a) that project so as to come into contact with the contact surfaces (9a, 12a) are disposed in the first joint portions (18, 19). The contact portions (10a, 13a) are formed such that the areas of the contact surfaces (10a1, 13a1) coming into contact with the contact surfaces (9a, 12a) are smaller than the areas of the non-contact surfaces (10b, 13b) which are created by leaving the gaps in the first joint portions (18, 19) by disposing the contact portions (10a, 13a).

By bringing only the contact portions (10a, 13a) into contact with the second joint portions (20, 21) in the first joint portions (18, 19) and, with respect to the non-contact surfaces (10b, 13b) other than the contact portions (10a, 13a), by creating the gaps with the second joint portions (20, 21), it is possible to suppress the vibration sound caused by contact. Further, since the gaps are deliberately created by disposing the contact portions (10a, 13a), the seal members (15, 16) that seal the gaps between the non-contact surfaces (10b, 13b) and the joint surfaces (9a, 12a) are arranged so as not to generate the wind noise that occurs when the air passing through the airflow path flows from the gaps.

As described above, with respect to the duct units (3, 4) in which the airflow paths for passing the airflow generated by the blower fan 2 are formed by joining the upper duct portions (9, 12) and the lower duct portions (10, 13), it is possible to achieve the suppression of the occurrence of the vibration sound and the wind noise by an easy configuration.

OTHER EMBODIMENTS

It should be noted that, in the embodiment described above, the contact portions (10a, 13a) are disposed in the lower duct portions (10, 13), and are brought into contact with the second joint portions (20, 21) of the upper duct portions; however, this is not limiting. For example, it is also acceptable to form the contact portions in the upper duct portions (9, 12), or to form the contact portions in both the upper duct (9, 12) and the lower duct portions (10, 13). Further, if the areas of the contact portions (10a, 13a) can be made small the dynamic displacement of the contact portions (10a, 13a) can be controlled by the fastening forces of the screws (11, 14), the contact surfaces of the contact portions are not necessarily circular, and may have any shape. Furthermore, although the seal members (15, 16) are adhered to the lower duct portions (10,13), in the above embodiment, this is not. limiting. For example, it is acceptable to adhere the seal members to the upper duct portions (9, 12), or to use fixing methods other than adhesion.

It should be noted that, in the embodiment described above, the duct units (3, 4) formed by the upper duct portions (9, 12) and the lower duct portions (10, 13) are described as examples; however, this is not limiting. It is acceptable that the duct unit be formed by equal to or more than three duct portions.

It should be noted that the embodiment described above is applicable to a case where the first joint portions (18, 19) and the second joint portions (20, 21), which serve as joints between the upper duct portions (9, 12) and the lower duct portions (10, 13), are combined in vertical cross sections that intersect with the direction of airflow. However, in the case of combining in the vertical cross section, there is a possibility that a small step may be created in the joint portions of the duct portions due to part tolerances, thereby increasing pressure loss due to the generation of turbulent flow. In addition, if the cross-sectional area on the downstream side is expanded so as to create the step in a direction that does not obstruct the airflow, there is a possibility that such expansion of the cross-sectional area may also lead to an increase in pressure loss due to the expansion of the airflow path cross section. Therefore, as described above, the upper duct portions (9, 12) and the lower duct portions (10, 13) are preferably formed such that the directions of the first joint portions (18, 19) and the second joint portions (20, 21) are aligned with the direction of airflow.

It should be noted that the embodiment described above is not limited to the duct units (3, 4) of the blowing apparatus 1 connected to the pre-fixing conveyance belt 217, and is also applicable to duct units of other blowing apparatuses. The other blowing apparatuses, although illustrations are omitted, include, for example, an image formation blowing apparatus, a power supply blowing apparatus, and a fixing blowing apparatus. The image formation blowing apparatus discharges heat to the outside of the casing without retaining the heat within the casing, while collecting ozone and scattered toner generated in the image forming step. Thereby, it is possible to prevent defective operations such as defective charging, including uneven charging caused by adhesion of ozone and scattered toner to the photosensitive drums and the charge units, as well as defective development and clogging of the toner conveyance path caused by deterioration of toner fluidity due to an excessive temperature rise.

To be noted, not limited to the duct units (3, 4) of the blowing apparatus 1 connected to the pre-fixing conveyance belt 217, the embodiment described above is also applicable to duct units of other blowing apparatuses. The other blowing apparatuses, while illustrations are omitted, include, for example, such as an image formation blowing apparatus, a power supply blowing apparatus, and a fixing blowing apparatus. The image formation blowing apparatus discharges heat to the outside of the casing without retaining the heat within the casing, while collecting ozone and scattered toner generated in an image forming step. Thereby, it is possible to prevent defective operations such as defective charging such as uneven charging, caused by the adhesion of ozone and the scattered toner to the photosensitive drums and the charge units, and defective development and clogging of a toner conveyance path, caused by the deterioration of fluidity due to an excessive temperature rise in the toner.

The power supply blowing apparatus discharges heat, generated in a power supply that supplies electric power for operating each unit, to the outside of the casing. In conjunction with the exhaust from the power supply blowing apparatus, the outside air is supplied from the outside of the casing for cooling, and it is possible to cool the power supply. Thereby, it is possible to prevent defective operations and the failure of each unit caused by decreased output due to an excessive temperature rise in the power supply. While collecting volatile organic compounds (VOC) and ultra fine particles (UFP) generated in the fixing step, the fixing blowing apparatus discharges the heat and humidity to the outside of the casing without retaining the heat and humidity within the casing. Thereby, it is possible to prevent poor fixing and defective operations caused by temperature rises in the toner and components due to retaining the heat within the casing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-146661, filed Sep. 15, 2022, which is hereby incorporated by reference herein in its entirety.

What is claimed is:
1. A duct unit configured to be coupled to a fan, the duct unit comprising:
   a first duct portion including a first joint portion;
   a second duct portion including a second joint portion that faces the first joint portion; and
   a seal member having elasticity,
   wherein the first duct portion and the second duct portion are configured to form an airflow path by being joined to each other,
   wherein the first joint portion includes a first surface and a projection portion projecting from the first surface, wherein the projection portion includes a second surface in contact with the second joint portion of the second duct portion,
wherein the seal member is arranged between the first surface of the first joint portion and the second joint portion to come into contact with the first surface of the first joint portion and the second joint portion, and
wherein an area of the second surface is smaller than an area of a contact portion of the first surface in which the first surface comes into contact with the seal member.

2. The duct unit according to claim 1, wherein the area of the second surface is equal to or more than 5% of the area of the contact portion of the first surface, and is equal to or less than 15% of the area of the contact portion of the first surface.

3. The duct unit according to claim 1, wherein a projection amount of the projection portion from the first surface is equal to or more than 0.4 mm.

4. The duct unit according to claim 1, wherein the first duct portion and the second duct portion are joined to each other by a fastening member to fasten the first duct portion and the second duct portion in the projection portion.

5. The duct unit according to claim 4,
wherein the fastening member includes a screw,
wherein the second duct portion includes a screw hole through which the screw passes,
wherein the projection portion includes a through hole through which the screw passes, and
wherein the second surface is formed in a circular shape, and
wherein a diameter of the second surface is equal to or more than 100% of a diameter of a head of the screw and is equal to or less than 120% of the diameter of the head of the screw.

6. The duct unit according to claim 1, wherein the seal member in a compressed state is arranged between the first surface of the first joint portion and the second joint portion.

7. The duct unit according to claim 6, wherein a compression ratio of the seal member in the compressed state is equal to or more than 20% and is equal to or less than 90%.

8. The duct unit according to claim 7, wherein the compression ratio of the seal member is equal to or more than 50%.

9. The duct unit according to claim 1, wherein the seal member is exposed to the airflow path.

10. The duct unit according to claim 1, wherein the seal member includes an expanded foam material made by expanding synthetic rubber.

11. An image forming apparatus comprising:
a blowing unit including the duct unit according to claim 1 and the fan coupled to the duct unit; and
a conveyance unit including a conveyance belt configured to convey a recording medium,
wherein the conveyance belt has an opening configured to hold the recording medium on the conveyance belt by the blowing unit drawing air through the opening.

12. A duct unit configured to be coupled to a fan, the duct unit comprising:
a first duct portion including a first joint portion;
a second duct portion including a second joint portion that faces the first joint portion; and
a seal member having elasticity,
wherein the first duct portion and the second duct portion are configured to form an airflow path by being joined to each other,
wherein the first joint portion includes a first surface and a projection portion projecting from the first surface,
wherein the projection portion includes a second surface in contact with the second joint portion of the second duct portion,
wherein the seal member is arranged between the first surface of the first joint portion and the second joint portion so as to come into contact with the first surface of the first joint portion and the second joint portion, and
wherein the seal member includes an expanded foam material made by expanding synthetic rubber.

13. An image forming apparatus comprising:
a blowing unit including a duct unit and a fan coupled to the duct unit; and
a conveyance unit including a conveyance belt configured to convey a recording medium,
wherein the conveyance belt has an opening configured to hold the recording medium on the conveyance belt by the blowing unit drawing air through the opening,
wherein the duct unit includes:
a first duct portion including a first joint portion,
a second duct portion including a second joint portion that faces the first joint portion, and
a seal member having elasticity,
wherein the first duct portion and the second duct portion are configured to form an airflow path by being joined to each other,
wherein the first joint portion includes a first surface and a projection portion projecting from the first surface,
wherein the projection portion includes a second surface in contact with the second joint portion of the second duct portion,
wherein the seal member is arranged between the first surface of the first joint portion and the second joint portion so as to come into contact with the first surface of the first joint portion and the second joint portion.

14. The image forming apparatus according to claim 13, wherein an area of the second surface is smaller than an area of a contact portion of the first surface in which the first surface comes into contact with the seal member.

15. The image forming apparatus according to claim 14, wherein the area of the second surface is equal to or more than 5% of the area of the contact portion of the first surface and is equal to or less than 15% of the area of the contact portion of the first surface.

16. The image forming apparatus according to claim 13, wherein a projection amount of the projection portion from the first surface is equal to or more than 0.4 mm.

17. The image forming apparatus according to claim 13, wherein the first duct portion and the second duct portion are joined to each other by a fastening member to fasten the first duct portion and the second duct portion in the projection portion.

18. The image forming apparatus according to claim 17,
wherein the fastening member includes a screw,
wherein the second duct portion includes a screw hole through which the screw passes,
wherein the projection portion includes a through hole through which the screw passes, and
wherein the second surface is formed in a circular shape, and
wherein a diameter of the second surface is equal to or more than 100% of a diameter of a head of the screw and is equal to or less than 120% of the diameter of the head of the screw.

19. The image forming apparatus according to claim 13, wherein the seal member in a compressed state is arranged between the first surface of the first joint portion and the second joint portion.

20. The image forming apparatus according to claim 19, wherein a compression ratio of the seal member in the compressed state is equal to or more than 20% and is equal to or less than 90%.

21. The image forming apparatus according to claim 20, wherein the compression ratio of the seal member is equal to or more than 50%.

22. The image forming apparatus according to claim 13, wherein the seal member is exposed to the airflow path.

23. The image forming apparatus according to claim 13, wherein the seal member includes an expanded foam material made by expanding synthetic rubber.

* * * * *